106. COMPOSITIONS, COATING OR PLASTIC.

84

No references 665,403

UNITED STATES PATENT OFFICE.

ERNST BUSHMAN, OF NEW YORK, N. Y., ASSIGNOR OF ONE-FOURTH TO WILLIAM BUCKNOR, OF SAME PLACE.

COMPOUND.

SPECIFICATION forming part of Letters Patent No. 665,403, dated January 8, 1901.

Application filed May 3, 1900. Serial No. 15,345. (No specimens.)

*To all whom it may concern:*

Be it known that I, ERNST BUSHMAN, a citizen of the United States, and a resident of New York, (Stapleton,) county of Richmond, and State of New York, have invented a certain new and useful Compound, of which the following is a specification.

My composition relates to a compound for covering walls, ceilings, &c.; and it consists of the following ingredients in the proportions stated, viz: oxid of zinc, six parts; pulverized flint, eight parts; pulverized silex, eight parts; solution of borax, one-half part; caustic soda, two parts; asbestos, four parts; water, two parts, and silicate of potash and soda enough to bring the composition to the consistency of a thick paste.

The solution of borax above mentioned is made up of the following proportions: borax, one part, and water, two parts, heated to 180° Fahrenheit. The proportions specified refer to weight.

This compound is applied while in its pasty condition as ordinary mortar and affords a covering for interior walls, ceilings, or floors.

Heretofore compounds of this nature have been made upon a lime basis, the lime being the principal constituent, and a resultant compound would be obtained that might be fireproof, but not altogether waterproof.

My compound is made up upon a strictly silicate basis, thereby assuring an absolutely waterproof compound when hardened, as well as a fireproof and hard substance for covering interior walls, ceilings, &c., and the nature of the ingredients composing my compound is such as to readily admit of the entire compound being tinted in any desired color.

The waterproof qualities, as well as the hardening qualities, of my compound enable it to be used as an exterior coating for walls and for sidewalks. It may also be used for various other purposes, as for the manufacture of bowls, baths, sinks, &c.

What I claim, and desire to secure by Letters Patent, is—

The above-described composition of matter consisting of oxid of zinc, pulverized flint, pulverized silex, borax, caustic soda, silicate of potash and soda, asbestos and water, in the proportions specified, substantially as described and for the purpose specified.

In testimony that I claim the foregoing as my invention I have signed my name, in presence of two witnesses, this 30th day of April, 1900.

ERNST BUSHMAN.

Witnesses:
B. McCOMB,
S. S. SUGAR,